March 4, 1969
C. P. WALES
3,431,480
METHOD FOR INCREASING THE DISCHARGE CAPACITY OF SILVER
ELECTRODE STORAGE BATTERIES
Filed June 14, 1966
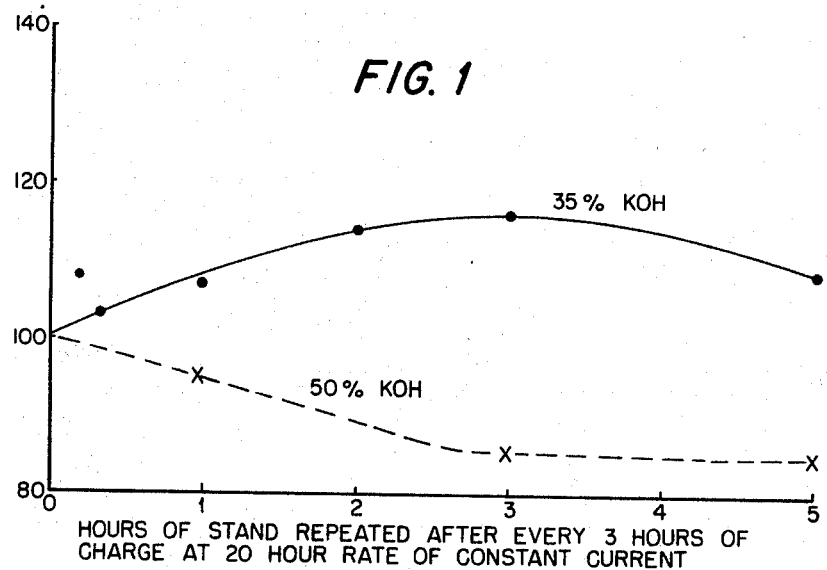
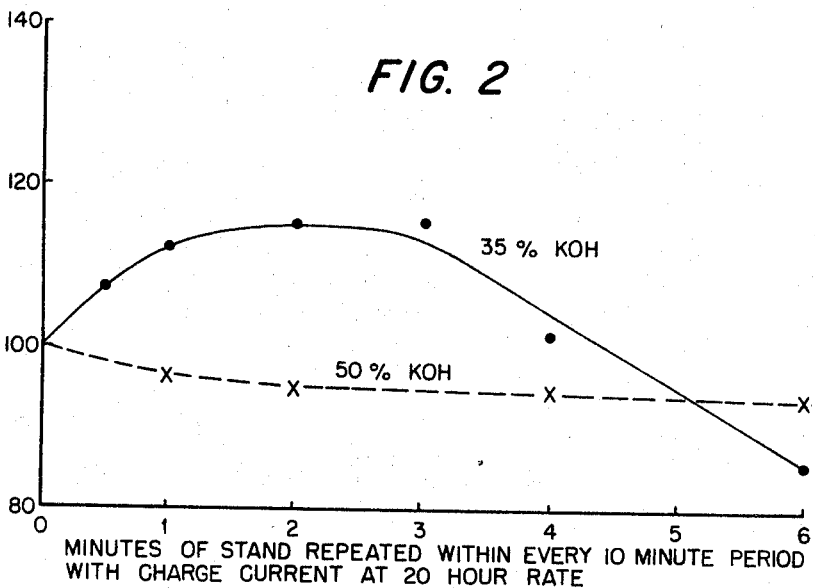
INVENTOR
CHARLES P. WALES
BY
ATTORNEY United States Patent Office 3,431,480
Patented Mar. 4, 1969

3,431,480
METHOD FOR INCREASING THE DISCHARGE CAPACITY OF SILVER ELECTRODE STORAGE BATTERIES
Charles P. Wales, Alexandria, Va., assignor to the United States of America as represented by the Secretary of the Navy
Filed June 14, 1966, Ser. No. 558,212
U.S. Cl. 320—21          8 Claims
Int. Cl. H02j 7/00; H01m 45/04

ABSTRACT OF THE DISCLOSURE

An improvement in methods for increasing the discharge capacity of silver electrodes whereby the charge current is periodically interrupted.

---

The invention described herein may be manufactured and used by or for the Government of the United States of America for governmental purposes without the payment of any royalties thereon or therefor.

The present invention relates generally to improvements in methods for increasing the discharge capacity of silver electrodes and the like and more particularly to a new and improved method for charging storage batteries or cells of storage batteries containing silver electrodes wherein the energy content of silver electrode cells or batteries is increased considerably.

Silver-zinc and silver-cadmium storage batteries have been put into increasingly wider usage in recent years. Although these batteries discharge readily at high rates of current, experience has shown that the positive silver electrode is difficult to charge completely except at low rates of current that require several days or longer for a complete charge. The usual capacity achieved is only approximately 40–60 percent of the theoretical capacity, except for the initial few cycles in which capacity usually gives higher values. However, it is highly desirable to be able to charge the silver electrode to a higher capacity, since storage batteries which contain positive silver electrodes are costly and are used mainly for purposes requiring an energy source of large capacity but of smaller size and weight than the conventional storage batteries of similar capacity.

The general purpose of this invention is to provide a charging method that increases the discharge capacity of silver electrodes of the type used in silver-zinc and silver-cadmium storage batteries. Another purpose of this new charging method is to shorten the time required for the complete charging of such storage batteries. To obtain this, the present invention contemplates a method whereby the charge current is periodically interrupted so as to increase the amount of silver oxide that forms on the silver electrode during the charge. The capacity of the following discharge is larger than the capacity following a normal charge using a constant current, and the average discharge capacity increases over 30 percent following charges when using the method of this invention under certain conditions.

An object of the present invention is the provision of a method for increasing the discharge capacity of silver electrodes.

Another object is to provide an improved method for charging a battery or cell which contains positive silver electrodes whereby a higher capacity is obtained than by previous charging methods.

A further object of the invention is the provision of a new charging method for shortening the time required to obtain a complete charge of silver-zince and silver-cadmium storage batteries.

Yet another object of the present invention is the provision of a method for storing increased amounts of energy in alkaline storage batteries, such as silver-zinc and silver-cadmium batteries.

A still further object of the present invention is to provide an improved method for increasing the discharge capacities of silver-zinc and silver-cadmium storage batteries which have approximately 30 to 45 percent alkaline solution electrolytes.

With these and other objects in view, as will hereinafter more fully appear, and which will be more particularly pointed out in the appended claims, reference is now made to the following description taken in connection with the accompanying drawing in which:

FIG. 1 shows a graphical representation of the discharge capacities of a silver electrode which was charged by a charge regime having periodic stand times between 3 hour periods of charge.

FIG. 2 graphically illustrates the discharge capacities of a silver electrode which was charged by a charge regime having periodic stand times within every ten minute period.

In each of the methods of charging shown in both FIG. 1 and FIG. 2 the same length of stand time which is peculiar to a particular charge regime is used repeatedly until a charge is completed, which completion is indicated by the potential of the silver electrode rising to the oxygen evolution potential.

The test cells used to demonstrate the method of this invention contain sintered silver plaques that are manufactured for use in commercial silver-zinc storage batteries. These silver plaques are wrapped in cellulosic separator material of the type normally used in commercial silver-zinc cells, and similar silver electrodes are used for both the cathode and anode. In addition, the electrolyte of the test cells which is used may contain from about 30–50 percent of an alkaline solution, e.g., potassium hydroxide.

Before charging with periodically interrupted current each new test cell is charged and discharged several times at a 20 hour rate constant current until capacity stops changing rapidly. A rate of constant current which requires approximately 20 hours for a complete charge or for a complete discharge of a test cell is here referred to as the 20 hour rate of constant current. The first or second charge-discharge cycle at the 20 hour rate of constant current may give as much as 70–80 percent of theoretical capacity for the sintered silver electrode; but capacity drops in the next few cycles and after about 12 cycles the capacity shows no further loss but rather varies irregularly, usually in the range of 40–55 percent of the theoretical capacity.

In addition to the sintered silver electrode plaques, a silver oxide reference electrode is included in each test cell and is used for all potential measurements. It is well known that the voltage of a cell is equal to the sum of the potentials of the positive and negative electrodes, and that changes in cell voltage do not indicate which of the electrodes has changed in potential. Therefore, it is standard practice to insert an auxiliary or reference electrode into a cell when it is desired to know the potential of a positive or negative electrode alone. Since the charge and discharge currents do not flow through this reference electrode, its potential does not change as the cell is charged and discharged and it has no effect on the cell capacity. Thus, the potential of the positive or negative electrode can be measured relative to this unchanging reference electrode, which enables the potential of one of the working electrodes to be determined independently of the changes in cell potential due to the other working electrode. As a result the capacity of the individual working electrodes of the cell can be determined separately.

The desired charging effects achieved in accordance with the present invention depend to a very great extent upon the proper choice of current, stand length and charge length between stands. Several types of charge regimes may be used. In one type of charge regime a cell is charged for 3 hours at the 20 hour rate of constant current, and this is followed by a stand period ranging from 12 minutes to 5 hours before resuming the charge, and the results of this charge regime are shown in FIG. 1. In another charge regime the charge period begins every 10 minutes, with the cell being charged at the 20 hour rate of constant current for periods ranging from 9.5 to 4 minutes, and the remaining 0.5 to 6 minutes being the stand period; the results of this charge regime are shown in FIG. 2. Still another charge method is derived from rectified 60 cycle alternating current, using unidirectional currents that are equivalent in coulombs per unit time to either the 20 hour or 6 hour charge rates, wherein a rate of constant current which requires about 6 hours for a complete charge is called the 6 hour charge rate. In order to determine whether the charge regimes used have any effect with relation to increasing the test cell's discharge capacity in comparison to the discharge capacity achieved at the 20 hour rate of constant current, the test cell should be charged and discharged at this 20 hour rate of constant current between each use of one of the above regimes. These three charge regimes are given only as examples, and illustrate that this charging method can be used under widely varying conditions, and are not given as limits within which beneficial results can be obtained.

Half-wave and full-wave rectified AC may be obtained from typical rectifier circuits, and rectified AC in which the current flow is less than one-half of the AC cycle may be obtained by using a silicon-controlled rectifier. These forms of current are used rather than a square wave because they are more easily obtained and are more practical for possible widespread use.

Rectified AC which consists of approximately the last halves of each rectified AC half-wave will be called quarter-wave rectified AC for simplicity. When using this charging method the current rises rapidly to a maximum value and then falls more slowly to zero with no current flowing for 75 percent of the time. Similarly, the last quarters of each rectified AC half-wave will be called eighth-wave rectified AC.

As shown in FIG. 1, when stand periods follow each 3 hour period of charge at the 20 hour rate of constant current, most charge-stand combinations give increased capacity in 35 percent KOH, and decreased capacity in 50 percent KOH. The plotted points for 50 percent KOH in FIG. 1 are the averages of two discharges, while the plotted points for 35 percent KOH are the averages of 3 to 7 discharges with individual capacities varying widely. For example, the 115.7 percent shown for 3 hour stands repeated every 3 hours in 35 percent KOH is the average of 5 discharges divided between two cells with individual capacities varying from 99.7 percent to 131.8 percent of normal capacity.

This charging method was tried with commercial silver-zinc cells and trends were similar although results were not identical with test cell results.

In addition, higher charge currents in 35 percent KOH also give beneficial results. For example, when there are 3 hour stand periods after every 3 hours of charge at a 6 hour rate of constant current the capacity averages 90 percent of the normal 20 hour charge rate capacity and only approximately 9 hours of total charge time and stand time is required. This compares favorably with the 83 percent of normal 20 hour charge rate capacity that is obtained when using an uninterrupted constant current at the 6 hour charging rate. Even better results are obtained by using 1 hour stands repeated after every 1 hour of charge at the 6 hour rate of constant current. Under these conditions a charge requires about 13 hours total time and discharges give an average 110.3 percent of the normal discharge capacity obtained after using the 20 hour constant current charge rate. Thus, increased capacity and decreased total charging time can be obtained simultaneously.

As shown in FIG. 2 stand periods repeated every 10 minutes during a charge can be beneficial or harmful depending upon conditions. Here again, although the averages fall close to a smooth curve, individual charges in 35 percent KOH give widely varying capacity, particularly when using stand periods of 2, 3 or 4 minutes. Here, also, higher charge currents in 35 percent KOH give beneficial results. When using the 6 hour rate of constant current in 35 percent KOH and having 2 minute stands within every 10 minutes, 98 percent of the normal 20 hour charge rate capacity is obtained in slightly over 8 hours instead of the 83 percent average obtained when using constant current at the 6 hour rate. The results achieved when using 50 percent KOH are not beneficial.

There is shown in Table I, below, that a charge current which is interrupted 60 times per second results in an improved capacity when using 35 percent KOH, but has no particular effect when using 50 percent KOH. Several cells were used in obtaining the results shown in Table I and the average value of the pulsating current used was equivalent to the 20 hour rate of constant current. Results are given as a percent of the average discharge capacity which was obtained when using the 20 hour rate of constant current for charge and discharge.

TABLE I.—EFFECT OF 20 HOUR CHARGES USING CURRENT PULSATING 60 CYCLES PER SECOND

| Type of charge current | Average discharge capacity in percent of capacity obtained following constant current charges at 20 hour rate | |
|---|---|---|
| | 35% KOH | 50% KOH |
| Constant D.C. | 99.8 (22) | 100.1 (12) |
| Full-wave rectified A.C. | 123.2 (6) | 99.1 (2) |
| Half-wave rectified A.C. | 128.9 (3) | 100.8 (2) |
| Quarter-wave rectified A.C. | 131.0 (4) | 95.0 (2) |
| Eighth-wave rectified A.C. | 125.9 (5) | 101.4 (2) |

Values in parentheses give the number of measurements made.

During a discharge following a normal charge at the 20 hour rate of constant current, 26 to 32 percent of the total discharge is obtained at higher potentials (often called the upper potential plateau) before reaching the relatively constant potential of the $Ag_2O/Ag$ plateau. The proportion of the total discharge at the higher potentials after a normal constant current charge is the same as the proportion obtained after a charge with repeated stands, with but few exceptions. However, the proportion of total discharge at the upper potential plateau is often 5 to 10 percent longer than normal following charges having stands of 2 or more hours after each 3 hours of charge; but, after charging with the various forms of rectified 60 cycle AC, as shown in Table I, the discharge at the upper plateau is at a lower potential than the discharge at the upper plateau following a normal charge at the 20 hour rate of constant current and the proportion of the total discharge before reaching the Ag₂O/Ag potential plateau is usually 5 to 10 percent shorter than normal, the length of discharge time obtained at this plateau not having increased as much as the total length of discharge time. This shorter length of discharge time before reaching the Ag₂O/Ag potential plateau can be desirable in order to give a more constant overall discharge potential.

There is shown in Table II below, that in 35 percent KOH a constant current at the 6 hour rate gives only about ⅚ (83.6%) of normal discharge capacity attained after using the 20 hour rate of constant current, but close to this normal capacity could be obtained by using the rapidly pulsating unidirectional currents of this invention. Here again, a relatively large improvement in discharge capacity results from the use of quarter-wave rectified AC and eighth-wave rectified AC. It is clear from a comparison of the results shown in Tables I and II that the benefits obtained from the interrupted charge at the 6 hour rate are less with respect to the results obtained from using the 6 hour rate of constant current with no interruptions than are the benefits obtained from using the interrupted charge at the 20 hour rate with respect to the results obtained from using the 20 hour rate of constant current without interruptions.

TABLE II.—CAPACITY FOLLOWING CHARGES AT 6 HOUR RATE USING CURRENT PULSATING 60 CYCLES PER SEC. COMPARED TO CAPACITY FOLLOWING CONSTANT CURRENT CHARGES AT 20 HOUR RATE

| Type of charge current | Average discharge capacity in percent of capacity obtained following constant current charges at 20 hour rate | |
|---|---|---|
| | 35% KOH | 50% KOH |
| Constant D.C. at 6 hour rate | 83.3 (4) | 67.9 (6) |
| Full-wave rectified A.C. | 83.0 (3) | 57.8 (2) |
| Half-wave rectified A.C. | 82.4 (3) | 66.3 (2) |
| Quarter-wave rectified A.C. | 99.0 (3) | 53.7 (2) |
| Eighth-wave rectified A.C. | 97.2 (3) | 55.8 (2) |

Values in parentheses give the number of measurements made.

Experimental results show that significant improvements in capacity are possible through the use of repeated open-circuit periods during the charge. The largest capacity increases are obtained by using a rapidly fluctuating unidirectional current with stand periods as shown in Table I. All of these rapidly pulsating currents at the 20 hour charge rate show improved capacity in 35 percent KOH.

A comparison of FIGS. 1 and 2 shows that neither stand time, charge time nor the ratio of these periods determines whether or not a particular charge-stand combination is beneficial. A disadvantage to some of these types of charges with repeated stands is that the total time to charge the battery or cell increases greatly; however, higher capacity is not just an effect of this total charge time increasing. For example, charging at the 6 hour rate of constant current with 1 hour stand periods after every hour of charge requires only two-thirds of the normal charge time at the 20 hour rate of constant current but gives 10 percent more capacity. Charge periods of 3 hours at the 20 hour rate of constant current alternating with stand periods of 3 hours require approximately the same total time as the 40 hour rate of uninterrupted constant current but average about twice as much capacity improvement over the 20 hour rate of constant current as does the 40 hour rate of constant current.

The most important cause of increased electrode energy capacity resulting from the use of the charge regimes of this invention is believed to be an increased electrode surface area. By using the method of this invention, the utilization of silver, based on the amount that the electrode is oxidized, may be increased to a much greater extent than has been done in previous charging methods. Under varying conditions of current, stand length and charge length between stands, as previously set forth, an increase in discharge capacity of electrodes of about 20 to 30 percent is readily obtained by means of the present charging method.

While no attempt is made to explain the exact mechanism of the reaction which takes place when an interrupted charge current is passed through an alkaline cell or battery in reverse direction to the normal flow of current during discharge, it is believed that several phenomena may be involved. One of the most important may be that the pulses of the charge current allow the formation of silver oxides below the film of silver oxide which forms on the electrode surface. The silver oxides occupy a larger volume than the metallic silver, and the expansion which takes place below the surface film may rupture this film, thus allowing the oxygen to penetrate more readily through the silver oxide layer and to move to proper sites within the silver electrode for further oxidation of the silver during the periods of steady current flow.

It is clear that the present method provides for increased discharge capacity for silver electrodes, the charging of which has been difficult by using conventional methods. The method of this invention is especially useful for increasing the discharge capacity of silver-zinc and silver-cadmium batteries and is useful in charging these batteries to their normal capacity in much shorter time periods than has heretofore been required.

Obviously many modifications and variations of the present invention are possible in the light of the above teachings. It is therefore to be understood, that within the scope of the appended claims, the invention may be practiced otherwise than as specifically described.

What is claimed and desired to be secured by Letters Patent of the United States is:

1. The method of shortening the time required for the complete charging of a silver electrode in an alkaline electrolyte storage battery and of increasing the discharge capacity of the silver electrode in an alkaline electrolyte storage battery which comprises:
    passing a unidirectional current through said electrode at a predetermined charging rate wherein said unidirectional current includes a periodic series of current pulses each having a predominantly constant value wherein the period of said pulses is greater than one second, and wherein the amplitudes of said pulses are approximately equal; and
    interrupting said unidirectional current at time intervals to increase the charge acceptance of said electrode.

2. The method of claim 1 wherein said time intervals are short with respect to the length of time of each of said current pulses.

3. The method of claim 1 wherein said time intervals are equal to the length of time of each of said current pulses.

4. The method of shortening the time required for the complete charging of a silver electrode in an alkaline electrolyte storage battery and of increasing the discharge capacity of a silver electrode in an alkaline electrolyte storage battery which comprises:
    passing a unidirectional current having the characteristics of a rectified sinusoidal alternating current through said electrode at a predetermined charging rate; and
    interrupting said unidirectional current at time intervals less than the duration of a single cycle of said unidirectional current to increase the charge acceptance of said electrode.

5. The method of claim 4 wherein said unidirectional current comprises current having the characteristics of full-wave rectified alternating current.

6. The method of claim 4 wherein said unidirectional current comprises current having the characteristics of half-wave rectified alternating current.

7. The method of claim 4 wherein said unidirectional current comprises current having the characteristics of quarter-wave rectified alternating current.

8. The method of claim 4 wherein said unidirectional current comprises current having the characteristics of eighth-wave rectified alternating current.

References Cited

UNITED STATES PATENTS

| | | | |
|---|---|---|---|
| 1,743,594 | 1/1930 | Broadfoot | 320—21 |
| 2,637,836 | 5/1953 | Kendall et al. | 320—24 |
| 2,977,525 | 3/1961 | Medlar | 320—21 X |
| 3,089,073 | 5/1963 | Godshalk | 320—21 |
| 3,160,805 | 12/1964 | Lawson | 320—39 |
| 3,252,070 | 5/1966 | Medlar et al. | 320—21 |
| 3,300,704 | 1/1967 | McMillen | 320—61 |
| 3,310,729 | 3/1967 | Burgess et al. | 321—18 |

JOHN F. COUCH, *Primary Examiner.*

WM. SHOOP, *Assistant Examiner.*

U.S. Cl. X.R.

307—82; 321—14, 27